United States Patent [19]

Paskins et al.

[11] 4,204,879

[45] May 27, 1980

[54] AMINO ACID SALTS OF ANIONIC DYESTUFFS WHICH HAVE HIGH SOLUBILITY IN ORGANIC SOLVENTS

[75] Inventors: Keith N. Paskins, Twickenham; Duncan C. Redman, Hounslow; Ian D. Turner, Richmond, all of England

[73] Assignee: Williams (Hounslow) Limited, Hounslow, England

[21] Appl. No.: 858,446

[22] Filed: Dec. 7, 1977

[30] Foreign Application Priority Data

Dec. 19, 1976 [GB] United Kingdom ............... 51454/76

[51] Int. Cl.$^2$ .. C09B 29/38; C09B 45/16; C09B 45/20; C09B 55/00

[52] U.S. Cl. .............................. 106/311; 106/288 Q; 106/22; 106/23; 260/145 A; 260/145 B; 260/146 R; 260/147; 260/148; 260/149; 260/150; 260/151; 260/429 C; 260/438.5 R; 260/439 CY; 8/597; 8/582

[58] Field of Search ............ C09B/29/38; 260/145 A, 260/145 B, 146 R, 147, 148, 149, 150, 151, 429 C, 438.5 R, 439 CY; 106/288 Q, 311; 8/42 R, 83, 92, 94 R, 93

[56] References Cited

U.S. PATENT DOCUMENTS

| | | | |
|---|---|---|---|
| 2,841,576 | 7/1958 | Zickendraht et al. ............ | 260/145 B |
| 3,030,353 | 4/1962 | Kuster .................................. | 260/147 |
| 3,169,824 | 2/1965 | Gagliardi .................................. | 8/55 |
| 3,600,373 | 8/1971 | Zickendraht et al. ............ | 260/146 R |

FOREIGN PATENT DOCUMENTS

| | | | |
|---|---|---|---|
| 944409 | 12/1963 | United Kingdom ...................... | 260/147 |
| 1324806 | 7/1973 | United Kingdom ...................... | 260/147 |
| 1392572 | 4/1975 | United Kingdom ...................... | 260/147 |

*Primary Examiner*—Floyd D. Higel
*Attorney, Agent, or Firm*—Omri M. Behr

[57] ABSTRACT

This invention concerns a range of amino-acid salts of anionic dyestuffs which have a high solubility in organic solvents, particularly oxygenated, halogenated and amido organic solvents. The amino-acid dyestuff salts have the general formula:

$$[Am^+]_{n-g}A^{n-}[Cat^+]_q \qquad (1)$$

wherein $Am^+$ is an amino-acid portion of the formula:

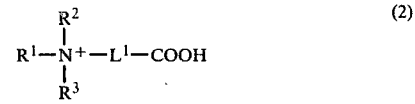

(2)

in which $L^1$ is a radical of the formula:

$$-(CR^4R^5)_x-$$

where $R^4$ and $R^5$ are each, independently of one another, selected from the group consisting of hydrogen, linear and branched lower alkyl, unsubstituted and substituted aryl and unsubstituted and substituted amino, and x is an integer, $R^1$, $R^2$ and $R^3$ are each, independently of one another, selected from the group consisting of hydrogen, alkyl, aryl, alkaryl, aralkyl and the radical of the formula:

$$-L^2-COOH$$

where $L^2$ is any of the radicals of $L^1$, and which alkyl radicals and moities of $R^1$, $R^2$ and $R^3$ are selected from the group consisting of unsubstituted and substituted alkyl radicals and moieties and uninterrupted alkyl radicals and moieties and alkyl radicals and moieties interrupted by at least one hetero atom selected from the group consisting of oxygen and nitrogen, provided that each of $R^1$, $R^2$ and $R^3$ are not the group of the formula:

$$-L^2-COOH$$

at one and the same time, $A^{n-}$ is an anionic dyestuff portion having an n-fold negative charge, $Cat^+$ is a cationic radical, n is an integer, q is any of 0 and an integer, and when q is greater than 1 then each of the cations may be the same or different.

18 Claims, No Drawings

AMINO ACID SALTS OF ANIONIC DYESTUFFS WHICH HAVE HIGH SOLUBILITY IN ORGANIC SOLVENTS

BACKGROUND OF THE INVENTION (1) Field of the Invention

This invention relates to a range of so-called solvent dyes; i.e., a range of dyestuffs having a high solubility in organic solvents, and to a composition containing such a dyestuff and an organic solvent. The dyes are amine salts of anionic dyestuffs.

(2) Description of the Prior Art

Amine salts of anionic dyestuffs are known and it is also known that these amine salts are soluble in certain organic solvents (see, for example, U.K. Specifications Nos. 944409, 1324806 and 1392572). Many of these amine-dyestuff salts are, however, soluble only to a limited extent in certain organic solvents.

U.S. Specification 3169824 teaches that a wide range of salts of both anionic and cationic dyestuffs are useful for dyeing solid polyolefins and that such salts may be applied to the preformed polyolefin article as a solution in an organic solvent, as an aqueous dispersion or emulsion, or in liquid or molten form. Some of the many dyestuff salts disclosed are amine-dyestuff salts.

SUMMARY OF THE INVENTION

An object of the present invention is to provide a range of new dyes; namely, amino-acid dyestuff salts, which have a good solubility in a wide range of organic solvents, especially oxygenated, halogenated and amido organic solvents.

Another object of the invention is to provide a range of dyes soluble specifically in a wide range of oxygenated organic solvents, more specifically in both of technical ethanol and technical acetone to an extent of at least 5% weight/volume (w/v).

A still further object of the present invention is to provide a composition containing an organic solvent selected from an oxygenated, halogenated and amido organic solvent and at least 5% w/v of the dye, which dye is soluble to the extent of at least 5% w/v in both of technical ethanol (IMS) and technical acetone.

The new amino-acid dyestuff salts show good solubility in a wide range of solvents, although, of course, not necessarily a better solubility than all known amine salts in any specific solvent. The dyestuff salts of the invention have greater solubility in the majority of solvents in common use.

The new dyestuff salts of the invention are amino-acid-dyestuff salts of the formula:

$$[Am^+]_{n-q}A^{n-}[Cat^+]_q \qquad (1)$$

wherein $Am^+$ is an amino-acid portion of the formula:

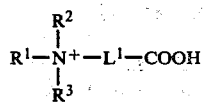
$$R^1-N^+-L^1-COOH \qquad (2)$$
with $R^2$ above and $R^3$ below N.

in which $L^1$ is a radical of the formula:

$$-(CR^4R^5)_x-$$

where $R^4$ and $R^5$ are each, independently of one another, selected from the group consisting of hydrogen, linear and branched lower alkyl, unsubstituted and substituted aryl, and unsubstituted and substituted amino, and x is an integer, preferably of from 1-3 inclusive, $R^1$, $R^2$ and $R^3$ are each, independently of one another, selected from the group consisting of hydrogen, alkyl, aryl, alkaryl, aralkyl, and the radical of the formula:

$$-L^2-COOH$$

where $L^2$ is any of the radicals of $L^1$, and which alkyl radicals and moities of $R^1$, $R^2$ and $R^3$ are selected from the group consisting of unsubstituted and substituted alkyl radicals and moities and uninterrupted alkyl radicals and moities and alkyl radicals and moities interrupted by at least one hetero atom selected from the group consisting of oxygen and nitrogen, provided that each of $R^1$, $R^2$ and $R^3$ are not the group of the formula:

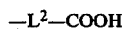
$$-L^2-COOH$$

at one and the same time, $A^{n-}$ is an anionic dyestuff portion having an n-fold negative charge, $Cat^+$ is a cationic radical, n is an integer preferably of from 1-3 inclusive, and q is any of 0 and an integer, preferably any of 1, 2 and 3, and when q is greater than 1 then each of the cations may be the same or different.

Each of $R^4$ and $R^5$ of the radical $L^1$ may be any of a hydrogen atom, a linear lower alkyl radical, for example, methyl, ethyl and n-propyl, and preferably methyl, an aryl radical, for example, unsubstituted and substituted phenyl, preferably unsubstituted phenyl, an unsubstituted amino radical and an amino radical substituted by an alkyl radical, for example, 2-ethylhexyl and iso-tridecyl.

In particularly preferred radicals of $L^1$, each of $R^4$ and $R^5$ is a hydrogen atom at the same time, a methyl radical at the same time, or one is a hydrogen atom and the other a methyl group, and the value of x is selected from 1 and 2. These values are preferred because it is believed that solubility is improved when the amino and carboxylic acid groups of the amino acid portion are in close proximity with one another, and in addition because the relevant intermediates for preparing the amino-acid portions are more easily available. However, amino-acid dyestuff salts having an amino acid portion in which x is a higher number, for example, 10, have been found to have good solubility in organic solvents.

When the value of x is 2, then the amino acid portion is a β-amino acid and preferred values of $L^1$ in such β-amino acids are radicals of the formula

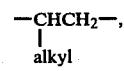
$$-\underset{\text{alkyl}}{\text{CHCH}_2}-,$$

for example, $-CH(CH_3)CH_2-$, this being particularly preferred.

When the value of x is 1, then the amino acid portions are α-amino acids where $L^1$ is preferably $-CH_2-$ or $-C(CH_3)_2-$.

The alkyl groups of $R^1$, $R^2$ and $R^3$ are selected from linear and branched alkyl radicals containing from 1-20 carbon atoms, preferably 6-20 carbon atoms, for example, 2-ethylhexyl, iso-tridecyl, a mixed $C_{11-17}$ alkyl, and a mixed $C_{6-18}$ alkyl, n—$C_8H_{17}$—alkyl, alicyclic alkyl radicals, preferable $C_{3-7}$ cyclic alkyl, for example, cyclohexyl, the linear and branched alkyl radicals being selected from uninterrupted said alkyl radicals and said alkyl radicals interrupted by at least one hetero atom selected from oxygen and nitrogen, for example, alkyloxyalkyl, alkylaminoalkyl and alkylamidoalkyl, for example, N-3-(2'-ethylhexoxy)propyl-and the radical of the formula $C_{11-17}$-CONH—(CH2)3—.

When any one or more of $R^1$, $R^2$ and $R^3$ is selected from aryl, alkaryl and aralkyl, the aryl radical or moiety thereof is preferably a phenyl radical selected from ylamino-(α-dimethyl)-propionic acid, iso-tridecylamino-(α-dimethyl)-propionic acid, 2-ethylhexylamino n-butyric acid, iso-tridecylamino-n-butyric acid, 2-ethylhexylamino n-undecadoic acid, iso-tridecylamino-n-undecanoic acid, cyclohexylamino acetic acid, iso-tridecylamino acetic acid, di-(hydroxyethyl)-amino-acetic acid, mixed $C_{11-17}$ alkylamidopropyl-dimethylamino acetic acid, 2-ethylhexylamino diacetic acid, 2-ethylhexylamino triacetic acid, di- and tri-(2-ethylhexylamino)- and (iso-tridecylamino)acetic acid.

A list of further examples of amino-acid portions conferring good solubility upon amino-acid dyestuff salts in certain solvents is given in Table 1 below:

Table 1

| Example No. | Name | $R^1$ | $R^2$ | $R^3$ | L |
|---|---|---|---|---|---|
| 1 | glycine | H | H | H | —CH2— |
| 2 | betaine | Me | Me | Me | —CH2— |
| 3 | N-octylglycine | n-$C_8H_{17}$— | H | H | —CH2— |
| 4 | N-(2-ethylhexyl)glycine | $CH_3(CH_2)_3CH(Et)CH_2$— | H | H | —CH2— |
| 5 | N,N-di(2-ethylhexyl)glycine | " | As $R^1$ | H | —CH2— |
| 6 | N-phenylglycine | (phenyl) | H | H | —CH2— |
| 7 | N-(4-dodecylphenyl)glycine | $C_{12}H_{25}$—(phenyl)— | H | H | —CH2— |
| 8 | 'Armeen Z' | Mixed linear alkyl $C_6$-$C_{18}$ | H | H | —CH(Me)CH2— |
| 9 | N-3-(2'-ethylhexoxy)propyl glycine | $CH_3(CH_2)_3CH(Et)CH_2$—O—(CH2)3— | H | H | —CH2— |
| 10 | The 'primene 81-R'* derivative of glycine | Alkyl—C(Alkyl)(Alkyl)— (principally 12–14C atoms) | H | H | —CH2— |

*Manufactured by Rohm & Haas unsubstituted and substituted phenyl radicals and preferably unsubstituted.

Preferably, the amino-acid portion of the amino-acid dyestuff salt is a primary amine; i.e., each of $R^2$ and $R^3$ is hydrogen, or is a secondary or tertiary amine in which one or both of $R^2$ and $R^3$ is methyl.

Other preferred amino-acid portions in which the amino radical is secondary or tertiary are those containing, for example, di-(hydroxyalkyl)-amino, for example, di-(hydroxyethyl)-amino and alkylamidoalkylamino, for example, $C_{11-17}$ amidopropyl-, dimethyl-amino. Alternatively, in such an amino-acid portion containing a secondary or tertiary amino radical, one or both of $R_2$ and $R_3$ may be a carboxyalkyl radical and amino acid portion thus being a di- or tri-acid respectively, for example, an alkylamino di-acetic acid or tri-acetic acid.

A particularly preferred amino-acid portion is the commercially available "Armeen Z", manufactured by Akzo Chemie (UK) Limited, this being an amino-acid portion wherein $R^1$ is a mixture of primary alkyl groups having chain lengths of from $C_{6-18}$, each of $R^2$ and $R^3$ is a hydrogen atom and $L^1$ is —CH(CH3)CH2—. Armeen Z may also contain a small quantity (up to 5 or 6%) of primary free amine; i.e., without an acid radical, but with no detriment to the final amino-acid product.

When n-q is greater than 1, the amino acid portion of the formula (2) may be a mixture of more than one such amino-acid.

Typical examples of amino-acid portions of the formula (2) which have been found to form, with suitable anionic dyes, salts having good solubility in certain solvents are amino-dimethyl acetic acid, 2-ethylhex- The portion of the amino-acid dyestuff salt responsible for the colour contains at least an anionic dye portion, $A^{n-}$, having an n-fold negative charge, for example, unmetallized and metallized azo and azomethine dyes, and azine dyes.

A new range of amino-acid dyestuff salts which are particularly soluble in a wide range of organic solvents are the 1:1- and 1:2 metallized azo and azomethine dyes, especially the monoazo and monoazomethine dyes, and more especially the 1:2 metallized monoazo and monoazomethine dyes.

The negative charge on the anionic dyestuff portions may be due, for example, to one or more of the groups selected from carboxylic acid, sulphonic acid, unsubstituted and substituted amino radicals, and hydroxyl (but this latter radical being selected only in the case of metallized dyes since hydroxyl radicals do not, in general, ionize sufficiently for amine salt formation in unmetallized colours).

Although in preferred anionic dyestuff portions, a sulphonic acid or carboxylic acid radical may be present to confer thereon the required negative charge, it should be noted that, particularly for unmetallized dyes, it is likely that an increased number of carboxylic or sulphonic acid radicals causes a reduction in solubility of the resultant amino-acid dyestuff salt. There are, however, as later exampled, exceptions to this general principle.

Particularly suitable anionic dyestuff portions are selected from the anionic complexes of metallizable azo and azomethine dyestuffs with transition metals such as iron, nickel and especially chromium and cobalt. These complexes may have a metal:dye ratio of 1:1, but a much preferred ratio is 1:2 and in this latter case the two molecules of metallizable dye may be the same or different to give symmetrical or mixed complexes. Such mixed complexes may be obtained either by complexing two different dyestuff molecules to the same metal atom or by mixing together two symmetrical dyes each having complexed dyestuff molecules different from one another (i.e. A-M-A and B-M-B). Particularly suitable metallizable components are azo or azomethine dyes having hydroxyl, methoxy, carboxy- or amino- groups ortho- and ortho'- to the azo or azomethine link.

Suitable 1:2 metal complex dyes include those containing two molecules of the same or different monoazo or azomethine dyestuffs in which dyestuff or dyestuffs the azo or azomethine linkage is disposed between aromatic nuclei (which optionally contain a hetero atom), for example benzene, naphthalene, pyrazolene or acetoacetanilide, which are each substituted in the ortho position relative to the azo or azomethine linkage by any of a hydroxyl, carboxylic acid or optionally substituted amino group, the said molecules each being complexed with a complexing transition metal via hydroxyl, carboxylic and optionally substituted amino groups and via said azo or azomethine linkages. Preferably, the nuclei in each of the diazo precursors contained in the respective azo or azomethine dyestuffs are benzene nuclei each substituted in the said ortho position by a hydroxyl group, and the preferred complexing transition metal is chromium or cobalt.

The anionic dyestuff portion may be a neutral "zwitterion" so that the amino-acid dyestuff salt has the general formula [amino acid]+ −[dye]+ −[anion]. In such a case the amino-acid dyestuff salt is formed by reaction of the amino acid of the amino acid with the negatively charged group of the zwitterionic dye. Such a zwitterionic dye may, for example, be a cationic dyestuff portion provided with a negatively charged group, for example, a sulphonic acid group, to neutralise it. In theory, such a compound should not be able to keep up an amine, but in practice it does, an anion presumably being taken up during formation of the amino-acid dyestuff salt for electrical neutrality. A typical example of such a dyestuff portion is the 1:1 chromium:dye complex of 2-amino-4-nitrophenol-6-sulphonic acid→3-methyl-1-phenyl-5-pyrazolone.

Typical amino-acid metallized dyestuff salts within the present invention having good solubility properties are the amino-acid dyestuff salts formed by reacting any of the amino-acid portions given in Table 1 above, particularly the Armeen Z salt, with the 1:2 cobalt or chromium complex of the anionic dyestuff portion formed by coupling any one of the aromatic amines selected from 2-aminophenol; 2-amino-5-nitrophenol; 2-amino-4-chlorophenol; 2-amino-4-nitrophenol; 2-amino-4-nitrophenol-6-sulphonic acid; and 2-amino-4-methylphenol-6-sulphonic acid with any one of the coupling components selected from acetoacetanilide; 3-methyl-1-phenyl-5-pyrazolone; 3-methyl-1-(2'-chlorophenyl)-5-pyrazolone; and 2-naphthol.

Especially preferred examples of the amino-acid dyestuff salts of the invention are the Armeen Z salt of each of the following anionic dyestuff portions:

1:2 cobalt complex of 2-amino-4-nitrophenol→3-methyl-1-phenyl-5-pyrazolone, 1-2 cobalt complex of 2-amino-5-nitrophenol→3-methyl-1-phenyl-5-pyrazolone, 1:2 chromium complex of 2-amino-4-nitrophenol→3-methyl-1-phenol-5-pyrazolone, 1:2 chromium complex of 2-amino-5-nitrophenol→3-methyl-1-phenyl-5-pyrazolone, 1:2 cobalt complex of 2-amino-4-nitrophenol-6-sulphonic acid→3-methyl-1-phenyl-5-pyrazolone, 1:2 chromium complex of 2-amino-4-nitrophenol-6-sulphonic acid→3-methyl-1-phenyl-5-pyrazolone, 1:2 cobalt complex of 2-amino-4-nitrophenol→acetoacetanilide, 1:1:1 chromium complex with 2-aminophenol→3-methyl-1-phenyl-5-pyrazolone and 2-amino-5-nitrophenol→3-methyl-1-phenyl-5-pyrazolone, a nickel complex of 2-amino-5-nitrophenol→3-methyl-1-phenyl-5-pyrazolone (metal:dye ratio not determined)

1:2 chromium complex of an azomethine dyestuff, which complex has the formula

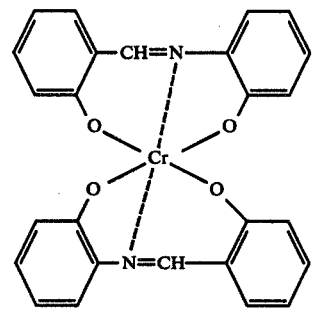

1:2 cobalt complex of 2-amino-4-methylphenol-6-sulphonic acid→acetoacetanilide.

Particularly bright colours can be obtained by including in the amino-acid dyestuff salt one or more cationic portions at least one of which is a cationic dyestuff portion. A preferred such amino-acid dyestuff salt contains one amino-acid portion, one anionic portion of 3-fold negative charge, one cationic portion of single positive charge and one proton, such a dyestuff having the formula:

[Am+]A3−[Cat+][H+]

Two typical examples of such amino-acid dyestuff salts are those containing one ionic dyestuff portion consisting of the 1:2 chromium and cobalt complexes respectively of 2-amino-4-nitrophenol-6-sulphonic acid→3-methyl-1-phenol-5-pyrazolone, one cationic dyestuff portion which is Rhodamine B, one proton and one amino-acid dyestuff portion which is Armeen Z.

These examples are two of a range of particularly important examples of dyestuffs within the present invention which may be represented by formula given below, in which the cationic dyestuff shown is Rhodamine B:

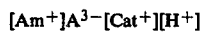

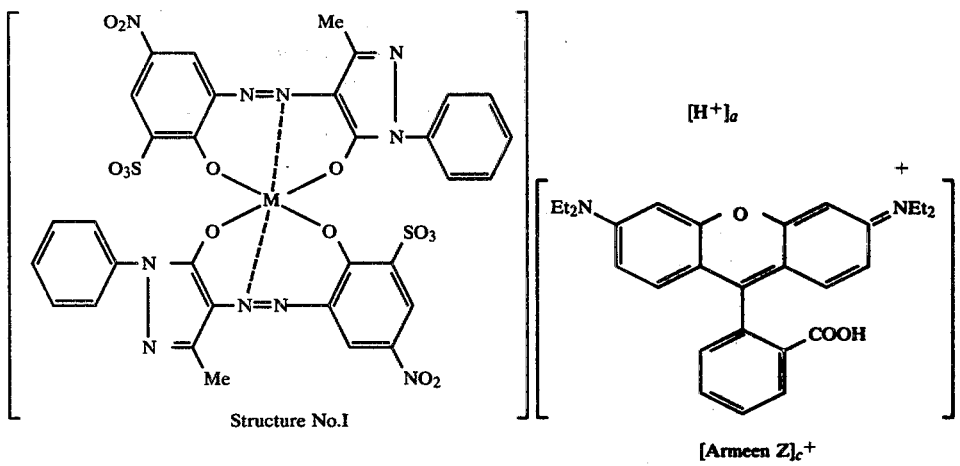

Structure No.I

M = Chromium or cobalt
a = 0 or 1
b = 1 or 2
c = 1 or 2

Such a dyestuff molecule may contain in addition to the one part of anion, either one part cationic dyestuff and two parts amino-acid (a=0, b=1 and c=2), or two parts cationic dyestuff and one part amino-acid (a=0, b=2 and c=1), or one part proton, one part cationic dyestuff and one part amino-acid (a=1, b=1 and c=1).

We have found that amino-acid dyestuff salts within the present invention have very low water solubility, but an exceptionally high solubility in a wide range of solvents, especially aliphatic solvents, but also in some aromatic solvents.

The amine dyestuff salts within the present invention are particularly soluble in organic solvents selected from the group consisting of oxygenated, amido and halogenated aliphatic hydrocarbons, especially the polar non-basic said solvents.

Preferred amino-acid dyestuff salts are especially soluble in each of technical ethanol and technical acetone and more preferably additionally ethyl acetate.

Some of the amino-acid dyestuff salts exhibit a solubility of over 100 percent in at least two of these three solvents, but an amino-acid dyestuff salt would be sufficiently useful if it were soluble to 5%, preferably 10% and more preferably 50% weight/volume.

Amino-acid dyestuff salts within the present invention are highly soluble in oxygen-containing aliphatic solvents, for example ketones (especially those of lower molecular weight such as acetone or butanone but including ketones of higher molecular weight and cylic ketones such as cyclohexanone and methyl cyclohexanone), alcohols (especially methanol, ethanol, n-propanol, iso-propanol and industrial methylated spirits and arylaliphatic alcohols such as benzyl alcohol), glycol ethers such as ethylene glycol monomethyl ether, ethylene glycol monoethyl ether and ethylene glycol monophenyl ether, and esters of these such as ethylene glycol monoethyl ether acetate, and ethers derived from the dimerised glycols such as diethylene glycol monoethyl ether, and in the dimerised glycols themselves, such as diethylene glycol and dipropylene glycol. Furthermore they may additionally show very good solubility in carboxylic acids, for example, acetic acid, acid esters, for example, ethyl acetate or butyl acetate or acid amides such as formamide or dimethylformamide.

In some cases they are also soluble in halogenated hydrocarbons, for example, chloroform, methylene chloride and perchlorcethylene. They may also be soluble in mixtures of the above solvents and in mixtures containing solvents in which the dyes may not themselves dissolve, such as toluene.

Because of the high solubility of these amino-acid dyestuff salts in a wide range of organic solvents, they have application for colouring products which require solvents in their manufacture. Thus amino-acid dyestuff salts within the present invention may be used for colouring, for example, cellulose acetate fibres, those having good solubility in ketones being especially useful for colouring diacetate.

Many amine salts within the present invention have a high solubility in a wide range of ketones, alcohols and esters and these are eminently suitable for printing inks for use in the flexographic and gravure processes. For example, aluminium foil can be printed by gravure.

Many such amino-acid dyestuff salts are compatible with the common surface coating resins, such as nitrocellulose, shallac, vinyl copolymers, amino resins, alkyds, cellulose ethers, cellulose esters, epoxy resins, polyamides, maleics, ketone resins and acrylics, so that they may be used together with other ingredients, such as wetting agents, slip aids and auxiliaries commonly used in the lacquer industry to form coloured lacquers and inks for coating metal foils, paper, glass, polymer films and metal sheets. Such lacquers, properly formulated, are stable and the coatings formed are water resistant.

Amino-acid dyestuff salts within the present invention may be used for colouring adhesives, particularly those used for laminating clear films such as nylon, regenerated cellulose, polyethylene, polypropylene and polyesters, to similar films or to paper or metal foils.

Similarly such amino-acid dyestuff salts may be used in the production of paints, woodstains, varnishes and other surface coatings. They can also be used for the dyeing and spraying of leather.

Many amino-acid dyestuff salts within the present invention have a high solubility in glycols, polyglycols and glycol ethers and are suitable for ball point pen inks.

Amino-acid dyestuff salts with high light-fastness can be prepared, this property making them suitable for staining oxide films, such as that formed on the surface of anodised aluminium.

An amino-acid dyestuff salt of the present invention may be prepared either in an aqueous or solvent medium.

If the anionic dye is soluble in water, the amino-acid (or sodium salt thereof) can be added to the dye solution (preferably at a pH of between 5 and 13) whereupon conversion to the amino-acid salt may occur either spontaneously, or after the addition of an acid. If an acid is used, this may either be an organic (e.g., acetic or formic) or a mineral acid (e.g., hydrochloric or sulphuric). The amino-acid dyestuff salt is essentially water-insoluble and can be isolated by filtering, centrifuging or decanting.

Anionic dyes of low aqueous solubility can be converted to their amino-acid dyestuff salts by reaction as above, but in aqueous suspension. Alternatively, however, they may be converted to their amino-acid dyestuff salts by addition of the amino acid to a solution of the dyestuff in a suitable organic solvent, for example, 2-ethoxyethanol or dimethylformamide. The amino-acid salt may be isolated by drowning into water and separation as for aqueous preparations, or by distilling off the solvent at atmospheric or reduced pressure.

When preparation of the amino-acid dyestuff salt is carried out under alkaline conditions in the presence of an alkali metal, then a product may be obtained which contains at least one alkali metal cation which neutralizes the corresponding charge on the anionic dye portion. This alkali metal cation can be removed by treating the product with an acid to give the free amino-acid dyestuff salt.

When the dyestuff salt is that of a metallized dye, a process for preparing the dyestuff salt starting from one or more unmetallized dyestuffs includes the steps of coupling the unmetallized dyestuff or dyestuffs with a metal complexing agent to form the metallized dyestuff and then reacting the metallized dyestuff with the amino acid to form the amino-acid dyestuff salt.

The coupling reaction forming the metallized dyestuff can be carried out in an aqueuous dispersion, but a medium either containing or consisting of an organic solvent may alternatively be employed.

The metallized dye thus formed may either be isolated and then reacted with the amine, or alternatively the amine may be added without isolation.

Processes for preparing amine salts within the present invention will now be described with reference to the following Examples.

DESCRIPTION OF PREFERRED EMODIMENTS

EXAMPLE 1

A solution of 37.2 g (0.21 mol) acetoacetanilide in dilute sodium hydroxide is run into a solution of 30.8 g (0.20 mol) 2-amino-4-nitrophenol in dilute hydrochloric acid, the latter having been diazotized at 10° C. by the addition of 14 g (0.20 mol) sodium nitrite. The mixture, which is just alkaline is stirred until coupling is complete, warmed to 90° C. and 24.0 g (0.10 mol) cobalt chloride added. After 15 minutes at 90° C. the suspension is made akaline to litmus with sodium hydroxide, cooled to 45° C. and 29.6 g (0.1 mol) Armeen Z added as an aqueous solution. The product obtained is filtered, washed with water, and dried at 70° C. A yield of 98.3 g (95%) of a yellow amino-acid dyestuff salt with excellent solubility in alcohols, ketones and alkoxyalkanols is obtained. Light and bleed fastness properties are good.

Alternatively, the pH of the suspension may be adjusted to 4, using dilute hydrochloric acid, before filtering, washing and drying. The yield obtained is 96.4 g.

EXAMPLE 2

75.6 g of the sodium salt of the 1:2 cobalt complex of the monoazo dyestuff which is obtained by coupling 2-amino-5-nitrophenol to 3-methyl-1-phenyl-5-pyrazolone is suspended in dilute sodium hydroxide solution (alkaline to phenolphthalein) at 70° C., and an aqueous solution containing 29.6 g Armeen Z added. The mixture is made acid to litmus (pH~6) with 18 ml. acetic acid before filtering, washing with 1000 ml water and drying at 80° C. 93.0 g (91%) of a red amino-acid dyestuff salt with good fastness properties and excellent solubility in many oxygen-containing solvents and also some chlorinated hydrocarbons is obtained.

The amino-acid dyestuff salts prepared by the processes of Examples 1 and 2 show particularly good solubility in ethanol, isopropanol, diacetone alcohol, benzyl alcohol, acetone, butanone methyl cyclohexanone, ethyl acetate, 2-ethoxyethanol, 2-methoxyethanol, diethyleneglycol monoethylether, 2-phenoxyethanol and dipropylene glycol. In certain of these solvents, solubility values as high as 800 or even 1000 g/l can be obtained. In particular, we find that the amino-acid dyestuff salts of Examples 1 and 2 can be dissolved in such quantities in each of acetone, methyl cyclohexanone, 2-ethoxyethanol, 2-methoxyethanol, diethyleneglycol monoethylether, and dipropylene glycol. The amino-acid dyestuff salt of Example 2 is also capable of solution to this extent in each of ethanol, butanone and 2-phenoxyethanol.

EXAMPLE 3

A solution of 15.7 g chromium acetate (18.5% chromium) in 40 ml hot water is boiled under reflux for 1 hour with 126 ml dimethylformamide and 2 ml acetic acid. 33.9 g of the monoazo dyestuff obtained by coupling 2-amino-4-nitrophenol to 3-methyl-1-phenyl-5-pyrazolone is added and warming continued (temperature about 120° C.) until 1:2 metal:dye complex formation is complete (about 1 hour). The mixture is allowed to cool to 70° C. before adding 14.8 g Armeen Z, stirring for 15 minutes, and drowning into 2000 ml cold water at 10° C. Filtration and washing with 800 ml water yields 42.9 g dry weight (84%) of an orange solvent dye which is an amino-acid dyestuff salt.

EXAMPLE 4

A solution of 9.4 g N-(2-ethylhexyl) glycine in 100 ml warm water is run into a suspension of 37.5 g of the sodium salt of the 1:2 metal complex dye used in Example 3 in dilute sodium hydroxide at 70° C. After 15 minutes at this temperature the pH is adjusted to 4 with dilute hydrochloric acid and the orange amino-acid dyestuff salt filtered off, washed with water, and dried. Yield = 36.2 g (79%).

A similar process can be carried out if the solution of 9.4 g N-(2-ethyl-hexyl) glycine in 100 ml water is replaced by 13.3 g N,N-di(2-ethylhexyl) glycine in 15 ml acetic acid. The yield is then 33.1 g.

Alternative amines with quantities and yields are given below:

| Quantity | Amino-Acid | Yield |
|---|---|---|
| 7.9 g | N-phenylglycine | 40.8 g |
| 7.8 g | N-cyclohexylglycine | 36.8 g |
| 12.3 g | N-[3-(2'-ethylhexoxy)propyl]glycine | 40.3 g |
| 7.7 g | Betaine hydrochloride | 35.4 g |
| 10.5 g | Aniline-N,N-diacetic acid | 36.7 g |

EXAMPLE 5

27.6 g of the mixed 1:2 chromium:dye complex prepared from equimolar proportions of the dyes 2-amino phenol→3-methyl-1-phenyl-5-pyrazolone and 2-amino-5-nitrophenol→3-methyl-1-phenyl-5-pyrazolone is dissolved in 250 ml of 2-methoxyethanol at 80° C. A solution of 11.9 g Armeen Z in 30 ml acetic acid is added and after 30 minutes stirring at 80° C. the mixture is drowned into 400 ml ice-water. The colour is filtered, washed with 100 ml water, and dried to 50° C. to yield 34.1 g (89%) of a red amino-acid dyestuff salt with excellent solvent solubility. Alternatively, instead of drowning into water, the colour may be isolated y distilling off the solvent under reduced pressure.

EXAMPLE 6

A solution of 44.4 g Armeen Z in 150 ml water is run into a suspension of 47.8 g of the 1:2 chromium:dye complex of 2-amino-4-nitrophenol-6-sulphonic acid→3-methyl-1-phenyl-5-pyrazolone in 1000 ml dilute acetic acid at 95° C. The mixture is stirred until the aqueous bleed is faint, filtered and washed to yield an orange solvent dye.

EXAMPLE 7

8.9 g Armeen Z is added to a solution of 0.03 mol of the azine dyestuff of structure II in 600 ml of dilute sodium hydroxide solution. The colour is precipitated by adding dilute hydrochloric acid until acid to Congo Red, filtered, washed with 300 ml water and dried to yield 28.0 g of a bright blue dyestuff.

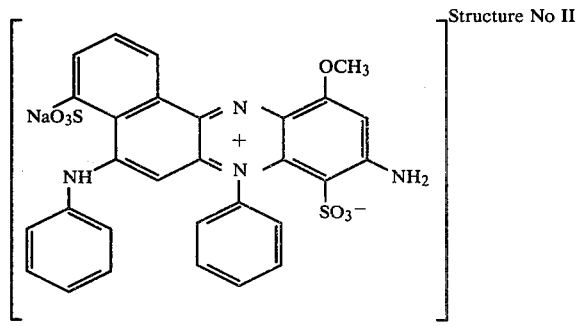

Structure No II

C.I. Acid Blue 102 (C.I. 50320)

It will be seen that the anionic dyestuff portion of this amino-acid dyestuff salt contains two sulphonyl radicals, and it would be expected that the presence of such radicals would lower the solubility to an intolerable degree. Surprisingly, however, the reverse is found to be the case, this amino-acid dyestuff portion exhibiting excellent solubility in lower alcohols and ketones.

EXAMPLE 8

15.4 g 2-amino-5-nitrophenol is diazotised and coupled to 18.6 g 3-methyl-1-phenyl-5-pyrazolone by the methods described in Example 1. The coupled suspension is warmed to 90° C., 27.8 g $FeSO_4.7H_2O$ is added as an aqueous solution, and the mixture is stirred 15 mins to complete metallization. The iron complex is isolated, dried, redissolved in 250 mls 2-methoxyethanol at 80° C. and treated with 14.8 g Armeen Z in acetic acid. The amino-acid salt is precipitated by drowning the cooled solvent solution into 500 ml water, yielding 42.6 g dry weight of a yellow-brown solvent dye.

EXAMPLE 9

An aqueous solution of 26.2 g $NiCl_2.6H_2O$ is added to a hot suspension of the azo dye prepared as in Example 8 and stirred at 90° C. for about 90 minutes until metallization is complete. The metal complex is isolated, dried, and a 15 g sample dissolved in 2-methoxyethanol and reacted with 7.5 g N-(2-ethylhexyl)glycine by the method of Example 8. The yield in this case is 15.8 g and the colour orange.

EXAMPLE 10

18.2 g chromium acetate is dissolved in 100 ml water and 25 ml conc. ammonia solution, acidified with 10 ml conc. $H_2SO_4$, and added to a solution of 13.8 g 2-amino-phenol in 600 ml dil. NaOH. 15.3 g salicylaldehyde is added and the mixture boiled under reflux for 5 hours until condensation and chroming are complete. The colour is isolated and dried after drowning into 1200 ml water, redissolved in 2-methoxyethanol, and reacted with 14.8 g Armeen Z by the method of Example 8. 32.1 g of a bright greenish-yellow dyestuff with excellent solvent solubility is obtained.

EXAMPLE 11

An aqueous solution containing 0.025 mol of the 1:2 chromium:dye complex of 2-amino-4-nitrophenol-6-sulphonic acid→3-methyl-1-phenyl-5-pyrazolone is adjusted to pH 0.5 with hydrochloric acid and boiled until conversion to the 1:1 chromium:dye complex is complete. After cooling to 80° C. the colour is filtered off, dried, redissolved in 2-methoxyethanol and reacted with 7.4 g Armeen Z by the method of Example 8. The yield is 15.8 g of an orange dye with excellent solvent solubility. This dye is a zwitterion within the formula

[amino-acid]$^{+-}$[dye]$^{+-}$[anion]

EXAMPLE 12

11.7 g 2-amino-4-nitrophenol-6-sulphonic acid is diazotized and coupled to 9.4 g 3-methyl-1-phenyl-5-pyrazolone. The pH is adjusted to 12 with dil. NaOH and 14.8 g Armeen Z added. An aqueous solution containing 6.3 g $CoCl_2.6H_2O$ is added and the reaction mixture is stirred until metallization is complete. A solution containing 12 g Rhodamine B is added and the colour precipitated by adjusting to pH 4 with dil. HCl. 50.8 g of a bright red dyestuff with good solubility in alcohols and ketones is obtained.

EXAMPLE 13

If the method of Example 12 is followed, but using only 7.4 g Armeen Z instead of 14.8 g and additionally including 24 g Rhodamine B, then 49.0 g of a bright bluish-red dyestuff with good solubility is obtained.

If the method of Example 13 is followed, but using 12 g Rhodamine B, then 33.2 g of a strong, bright red solvent dye is obtained. This is a dye within the formula

[Am]+A3−[Cat+][H+]

EXAMPLE 14

If 10.1 g 2-amino-4-methylphenol-6-sulphonic acid is diazotized and coupled to 8.9 g acetoacetanilide, and then reacted with 7.4 g Armeen Z and 15 g Auramine by the method of Example 12, 40.0 g of a bright greenish-yellow dyestuff with good solubility properties is obtained.

All weights of reagents used in the above Examples refer to pure samples, even though in many cases they are supplied or prepared as technical samples of less than 100% strength. In particular Armeen Z is supplied as a 50% aqueous paste but the quoted weights refer to the active amino-acid ingredients based on their molecular weight.

The improved solubility of amino-acid dyestuff salts within the present invention compared with those of conventional amine-dyestuff salts are illustrated in more detail by the results given in Tables 2 and 3.

The solubility values given in these Tables are the maximum concentration of dye in grams/liter giving a solution stable for 24 hours at room temperature.

Table 2 shows a comparison between solubilities of the same anionic dye (1:2 chromium complex of 2-amino-4-nitrophenol→3-methyl-1-phenyl-5-pyrazolone), prepared by the preliminary steps of each of the processes given in Examples 3 and 4 as its amine salt with a variety of amines, some forming amine salts within and some outside the invention, for comparison.

Table 2

| AMINE | Solubility (g.l$^{-1}$) | | |
|---|---|---|---|
| | Ethanol | Ethyl Acetate | Acetone |
| N-(2-ethylhexyl)glycine | 50 | 75 | >100 |
| N,N-di(2-ethylhexyl)glycine | 100 | 50 | >100 |
| N-phenylglycine | 50 | 100 | >100 |
| N-(iso-tridecyl)glycine | 350 | 250 | 350 |
| 'Armeen Z' | 350 | 200 | 700 |
| 2-ethylhexylamine* | 30 | <5 | >100 |
| di-(2-ethylhexyl) amine* | 20 | <5 | >100 |
| aniline* | <5 | <5 | 25 |
| 'Armeen C'* | 150 | 30 | 500 |
| iso-tridecylamine* | 200 | <50 | >500 |

*Comparative examples.

Table 3 gives a comparison of solubilities for amine-dyestuff salts containing different anionic dyestuff portions in three different solvents.

Table 3

| EXAMPLE | Armeen Z | | | Armeen C* | | |
|---|---|---|---|---|---|---|
| | E | EA | A | E | EA | A |
| (i) | 350 | 200 | >500 | 150 | 30 | 500 |
| (ii) | 350 | 200 | >500 | 120 | 90 | >500 |
| (iii) | >500 | 500 | >500 | 500 | 100 | >500 |
| (iv) | 200 | Insol | 300 | <10 | Insol | <10 |

E = Ethanol, EA = Ethyl Acetate, A = Acetone
*Comparative examples
Anionic Dyes in Table 3.
(i) 1:2 chromium complex of 2-amino-4-nitrophenol→3-methyl-1-phenyl-5-pyrazolone (Example 3)
(ii) 1:2 chromium complex of 2-amino-5-nitrophenol→3-methyl-1-phenyl-5-pyrazolone.
(iii) 1:2 cobalt complex of 2-amino-5-nitrophenol→3-methyl-1-phenyl-5-pyrazolone (Example 2).
(iv) C.I. Acid Blue 102 (C.I. 50320) (Example 7).

From these results it can be seen clearly that conversion of an amine $R^1R^2NH$ into its amino-acid derivative $R^1R^2$—N—$L^1$—COOH gives an amine salt with improved solubilizing power for a given anionic dye.

It can also be seen from the above results that although some amine-dyestuffs salts within the present invention are not as soluble in a specific solvent as previously known amine salts they are found to be relatively more soluble in a wide range of oxygen-containing solvents than such known salts. The range of amine-dyestuff salts within the present invention thus provides "across the board" solubility in such solvents, many of the amine-dyestuff salts being soluble at least to some extent in a much wider range of solvents than previously known amine-dyestuff salts, and thus being capable of being put to a wider range of uses.

They are also found to have the further advantages that (a) many of the dyestuff salts have a high rate of solubility even at room temperature (b) many are compatible with one another, especially if the same amine were used to make the salt, and (c) preferred metal complex dyes, which contain no sulphonic or carboxylic acid groups, thus carry only a single negative charge and require only a single molecule of amino acid to form the amine-dyestuff salt. This is sufficient to give good solvent solubility and therefore dyestuffs of particularly high strength may be prepared.

In particular a yellow dye formed with an unsulphonated metal complex dyestuff gives an especially strong colour.

We claim:

1. An amino-acid dyestuff salt of the formula:

$$[Am^+]_{n-q}A^{(-)}{}_n[Cat^+]_q$$

wherein Am+ is an amino-acid cation of the formula:

$$R^1\text{—}\underset{\underset{R^3}{|}}{\overset{\overset{R^2}{|}}{N^+}}\text{—}L^1\text{—}COOH$$

in which $L^1$ is a radical of the formula:

$$-(CR^4R^5)_x-$$

where $R^4$ and $R^5$ are the same or different and are selected from the group consisting of hydrogen, linear and branched alkyl, phenyl, and amino and x is an integer from 1 to 10, $R^1$, $R^2$, and $R^3$ are the same or different and are selected from the group consisting of hydrogen, cycloalkyl of 3 to 7 carbon atoms, phenyl, alkylphenyl, phenylalkyl, alkoxyalkyl, alkylaminoalkyl, alkylamidoalkyl and linear or branched chain alkyl wherein alkyl or alkoxy contains 1 to 20 carbon atoms, and the radical of the formula —$L^2$—COOH where $L^2$ is selected from the group —$(CR^4R^5)_x$— wherein $R^4$, $R^5$ and x are as defined above provided that $R^1$, $R^2$, and $R^3$ and x are not each simultaneously $L^2$ A is an anionic dye selected from the group consisting of azine azo and azomethine dyes and azo and azomethine dyes with transition metals, Cat+ is a cationic radical selected from cationic dyestuff radicals and a proton, n is 1, 2, or 3, q is 0, 1, 2, or 3 provided that n-q is other than 0 and where q is greater than 1 the cations comprising the [cat+] moiety are the same or different.

2. An amino-acid dyestuff salt in accordance with claim 1 wherein the ratio of metal to dye in said anionic dyestuff is 1:2.

3. An amino-acid dyestuff salt of claim 2 wherein the azo dye is a monoazo dye and the azomethine dye is a monoazomethine dye.

4. An amino-acid dyestuff salt according to claim 3 wherein each of the two linkages, each selected from azo and azomethine, is disposed between aromatic nuclei which are each substituted in the ortho position relative to the said linkage by any of the groups consisting of hydroxyl, carboxylic acid and amino.

5. An amino-acid dyestuff salt according to claim 1 wherein x is any of 1, 2 and 3.

6. An amino-acid dyestuff salt according to claim 5 wherein x is any of 1 and 2 and $R^4$ and $R^5$ are each selected from the group consisting of hydrogen and methyl.

7. An amino-acid dyestuff salt according to claim 1 wherein each of $R^2$ and $R^3$ is hydrogen.

8. An amino-acid dyestuff salt according to claim 7 wherein the amino acid portion is a mixed linear alkyl $C_{6-18}$ primary amino -B-methyl) - propionic acid.

9. An amino-acid dyestuff salt according to claim 1 wherein n is any of 1 and 2.

10. An amino-acid dyestuff salt according to claim 1 wherein q is any of 0, 1, and 2.

11. An amino-acid dyestuff according to claim 10 wherein q is 0.

12. An amino-acid dyestuff salt according to claim 10 wherein q is 1 and $Cat^+$ is a cationic dyestuff radical.

13. An amino-acid dyestuff salt according to claim 10 wherein q is 2, and one said cationic radical is a cationic dyestuff radical and the other said cationic radical is a proton.

14. An amino-acid dyestuff salt of claim 1 having a solubility of at least 5% w/v in at least two different polar nonbasic organic solvents said solvents having an aliphatic skeleton wherein at least 1 carbon atom of said skeleton is substituted by at least 1 oxygen atom, nitrogen atom, or halogen atom.

15. An amino-acid dyestuff salt according to claim 4 wherein the said two organic solvents are selected from the group consisting of ketones, alcohols, glycol ethers, esters of glycol ethers, carboxylic acids, carboxylic acids esters and acid amides.

16. An amino-acid dyestuff salt according to claim 15 wherein the said two organic solvents are technical ethanol and technical acetone.

17. An amino-acid dyestuff salt according to claim 16 which has a solubility of 5% w/v additionally in ethyl acetate.

18. A composition comprising: at least 5% w/v of a dyestuff of claim 14 and an organic solvent as set forth in claim 14.

* * * * *